United States Patent [19]

Miller

[11] Patent Number: 4,674,033
[45] Date of Patent: Jun. 16, 1987

[54] MULTIPROCESSOR SYSTEM HAVING A SHARED MEMORY FOR ENHANCED INTERPROCESSOR COMMUNICATION

[75] Inventor: Christopher G. Miller, Sevenoaks, England

[73] Assignee: British Telecommunications public limited company, Great Britain

[21] Appl. No.: 664,347

[22] Filed: Oct. 24, 1984

[30] Foreign Application Priority Data

Oct. 24, 1983 [GB] United Kingdom ............... 8328396

[51] Int. Cl.[4] ...................... G06Z 12/00; G06Z 15/56; H04T 3/24
[52] U.S. Cl. .................................... 364/200; 370/94; 379/284
[58] Field of Search ... 364/200 MS File, 900 MS File; 340/825.1; 370/60, 94; 179/18 ES

[56] References Cited

U.S. PATENT DOCUMENTS

| 4,484,273 | 1/1984 | Stiffler et al. | 364/200 |
| 4,491,909 | 1/1985 | Shimizu | 364/200 |
| 4,504,906 | 3/1985 | Ftaya et al. | 364/200 |
| 4,509,140 | 4/1985 | Cheung | 364/900 |
| 4,539,637 | 9/1985 | De Bruler | 364/200 |
| 4,543,626 | 9/1985 | Bean et al. | 364/200 |
| 4,543,627 | 9/1985 | Schwab | 364/200 |

FOREIGN PATENT DOCUMENTS

| 1249209 | 10/1971 | United Kingdom . |
| 1392231 | 4/1975 | United Kingdom . |
| 1440103 | 6/1976 | United Kingdom . |
| 2112186A | 7/1983 | United Kingdom . |

OTHER PUBLICATIONS

"Multiprocessor Communication System" by R. J. Bowater et al., *IBM Technical Disclosure Bulletin*, vol. 22, No. 11, pp. 5122-5123, Apr., 1980.

"Softward Development and Debug Aids for the u*-Multi-Microprocessor System" by G. Conte et al., *Sixth Euromicro Symposium and Microprogramming*, Sep. 16-18, 1980, pp. 149-156.

"Multi-Mikrocomputer-System Modular System Aufgebaut", *Elektronic*, vol. 31, No. 2, pp. 76-84, Jan. 29, 1982, with summary translation.

"High Capacity Packet Switching System by Means of Multi-Microprocessors" by T. Saito et al., *Proceedings of the Sixth International Conference on Computer Communications*, Sep. 7-10, 1982, pp. 817-822.

"Testing Packet-Switched Networks" by B. R. Spiegelhalter et al., *British Telecommunications Engineering*, vol. 2, part 1, pp. 12-16, Apr. 1983.

Primary Examiner—Archie E. Williams
Assistant Examiner—Thomas C. Lee
Attorney, Agent, or Firm—Nixon & Vanderhye

[57] ABSTRACT

A multiprocessor system consisting of a plurality of slave processors and a master processor each connected by a bus to a common memory. Message transfers are implemented by the master which scans one-byte areas in the common memory–each slave processor only being able to load a pointer to one said one-byte areas.

Contention problems are prevented because once a remote processor has loaded information to its one byte area it must pass control of the bus to another processor. The system is fast because the master does not waste time looking at empty memory.

41 Claims, 3 Drawing Figures

PARTIAL MEMORY MAP

Fig.2. PARTIAL MEMORY MAP

MULTIPROCESSOR SYSTEM HAVING A SHARED MEMORY FOR ENHANCED INTERPROCESSOR COMMUNICATION

FIELD OF THE INVENTION

This invention relates to a multiprocessor system in which a bus connects each processor to a common memory.

BACKGROUND OF THE INVENTION

Multiprocessor systems employing common memory for the transfer of information between processors are known. For example, in British Pat. No. 2,112,146 a system is disclosed in which information is transferred in response to interrupts. In an article by R. J. Bowater, et al in the IBM technical disclosure bulletin Volumn 22, No. 11, of April, 1980, a system is disclosed in which areas of memory are scanned in order to locate information which is to be transferred.

To ensure satisfactory operation of the above systems, while making efficient use of the common bus, contention for the bus must be resolved to ensure that all processors have access to the common memory. The rate at which each transfer is performed (for a given clock frequency) is determined by the number of instructions required to perform the transfer. It is therefore an object of the present invention to provide an improved multiprocessor system which provides fast information transfer while allowing each processor to have access to the common bus.

SUMMARY OF THE INVENTION

According to a first aspect of the invention there is provided a multiprocessor system, comprising a master processor, a plurality of independently controlled slave processors, a bus for connecting the slave processor and the master processor to a common memory, said common memory including:
(a) a plurality of message buffers for storing messages in which each message includes a label which identifies a destination slave processor,
(b) an input area associated with each slave processor such that information is supplied to an input area only from its associated slave processor, and each area occupies the minimum space required to identify one of said message buffers,
(c) an output queue associated with each slave processor such that the contents of an output queue are only read by its associated processor,
the system arranged to transfer information from a source slave processor to a destination slave processor, in which:
(e) a source slave processor supplies a message to an addressed message buffer and either prior or subsequent to supplying said message said first processor loads to its associated area a message buffer indicator which indicates the position of said addressed buffer,
(f) the master processor scans all the input areas to detect a message buffer indicator, reads the label stored within an indicated message buffer, and supplies at least part of the message to the output buffer associated with the destination processor, and
(g) each slave processor scans and reads messages from its associated output queue.

In a preferred arrangement a slave processor must request use of the bus from the master processor before said slave may access the common memory. The master processor may issue a bus acknowledge signal to a highest priority slave processor after receiving a bus request signal from any of the slave processors if the master does not itself require to access the common memory. Preferably the highest priority slave processor will relay a bus acknowledge signal to the next priority slave processor if said highest priority slave does not require to access the common memory and so on until all the slaves have received a bus acknowledge signal.

Preferably, after reading a message the master processor replaces the label which identifies the destination processor before writing the whole of said message to the associated output queue of the destination processor. Each message may include a chain pointer which may identify a further message which is to be supplied to the associated output queue of the destination processor.

In a preferred arrangement the common memory also includes a plurality of data buffers into which data is supplied by a source slave processor and ownership of the data buffer is transferred to a destination slave processor. Preferably each message also includes a data pointer which may identify a data buffer to a destination processor such that on receiving said message said destination processor takes over the ownership and has sole use of said data buffer.

In a preferred arrangement messages are written into an output queue in a cyclic manner and the master processor records the position where the last write occurred to each of said queues. Preferably each slave erases information from its associated output queue thus leaving the positions blank once said data has been read by said slave. A slave may then stop reading from its associated output queue after detecting one blank. Preferably a slave may scan information in its output queue without erasing said information in an attempt to locate a specific message and on detecting said message said slave will return to the unattended information in said queue. A slave may also periodically read a predetermined location in its associated output queue out of sequence and on detecting a crash command at said predetermined location said slave processor will attempt to retain synchronization with the master processor.

Preferably the input areas consist of single consecutive memory locations and the maximum number of message buffers is determined by the word length of said locations.

BRIEF DESCRIPTION OF THE DRAWINGS

The invention will now be described by way of example only with reference to the accompanying Figures of which.

DETAILED DESCRIPTION OF THE INVENTION

Figure 1:
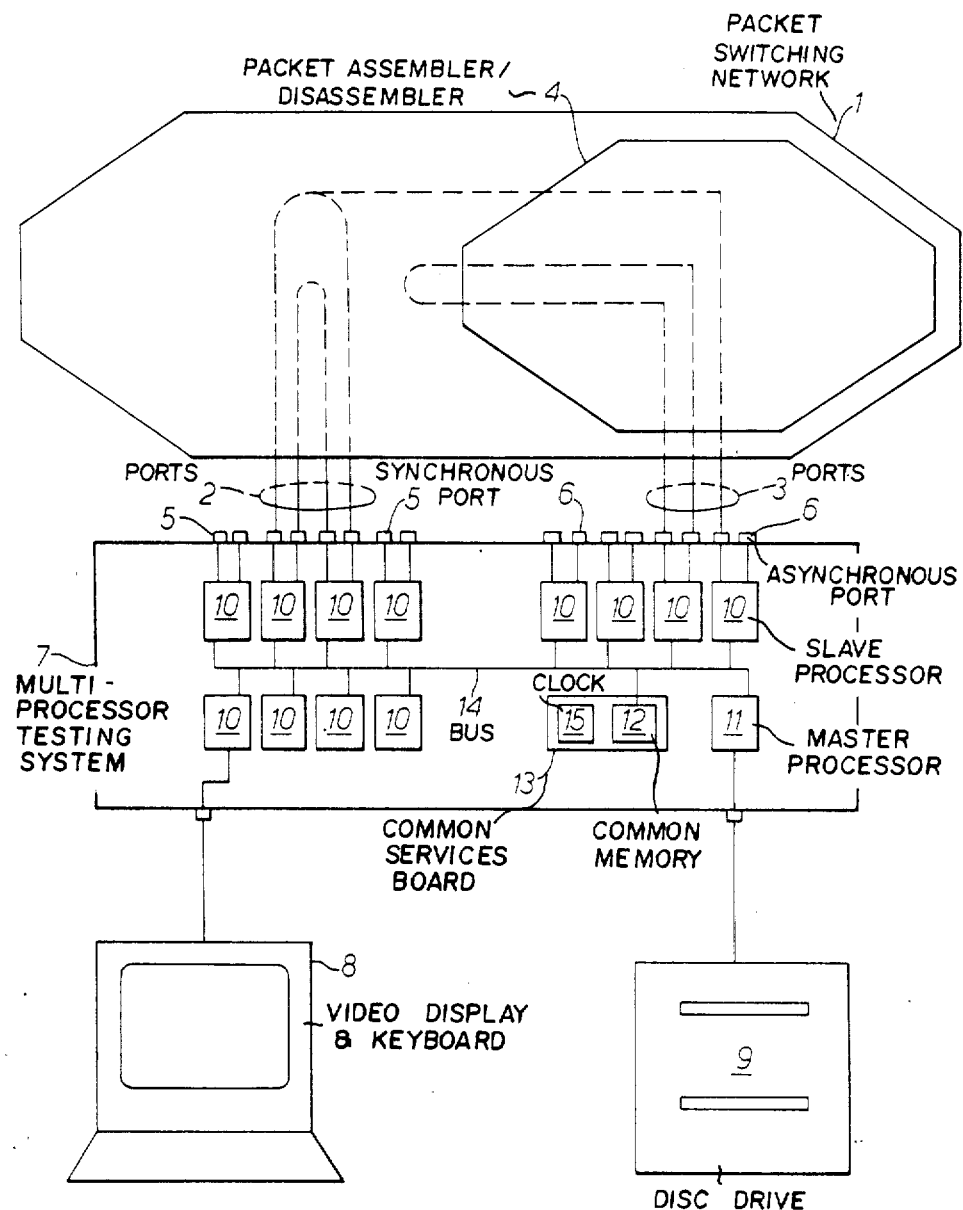
FIG. 1 is a schematic representation of a multiprocessor testing apparatus for testing a packet switching network including a common memory.

A packet switching network 1 is shown schematically in FIG. 1 having four synchronous terminals 2 and three asynchronous terminals 3. Information transferred over the asynchronous terminals must be interfaced to the packet switching environment by means of packet assembler/dissemblers shown generally by 4. Each synchronous and asynchronous terminal is respectively connected to a synchronous port 5 or an asynchronous port 6 of a multiprocessor testing system 7. The testing system includes a VDU/keyboard terminal 8 and a disc drive 9 allowing test programs to be loaded which generate a plurality of calls over a wide range of speeds and record the response of the network 1 to said calls.

The multiprocessor testing system 7 consists of twelve slave processors 10 (each based on a Zilog Z80 microprocessor) and a similar master processor 11. Ports 2 and 3 are grouped into pairs and each pair is interfaced to the system 7 by one of the slave processors 10. Of the remaining four processors one controls the operation of the VDU and keyboard 8, one implements CCITT X25 level 2 protocol, a third formats information for displaying on the VDU, and a fourth provides X25 level 3 and organizes network tests. The master processor 11 controls the operation of the disc drive 9 and performs a central role with respect to the movement of information within the multiprocessor system.

The master processor 11 and each slave processor 10 may access 64K memory positions. Half of this addressable memory takes the form of local memory which is unique to each processor. The remaining 32K is used to address common memory 12 located on a common services board 13. Each processor 10, 11 has access to the common memory 12 over a common bus 14—the bus is essentially controlled by the master 11 and each slave 10 must request use of the bus 14. The common services board 13 also includes a clock 15 (which generates timing signals for all of the processors 10, 11 in the multiprocessor system 7) and may include another Z80 microprocessor for organizing the functions it is required to perform.

The local memory of each slave processor 10 and the local memory of the master processor 11 consists of 2K of ROM and 30K of RAM. Application programs are loaded into the RAM from the disc 9 while the instructions held by the ROM control the transfer of information within the system 7. The multiprocessing system 7 may therefore operate in accordance with the present invention before application programs are loaded to the processors. The software of each processor uses the common memory for transferring information by arranging said common memory into a plurality of block, however, these blocks do not determine the physical arrangement of the common memory which is 32K of standard RAM.

Figure 2:
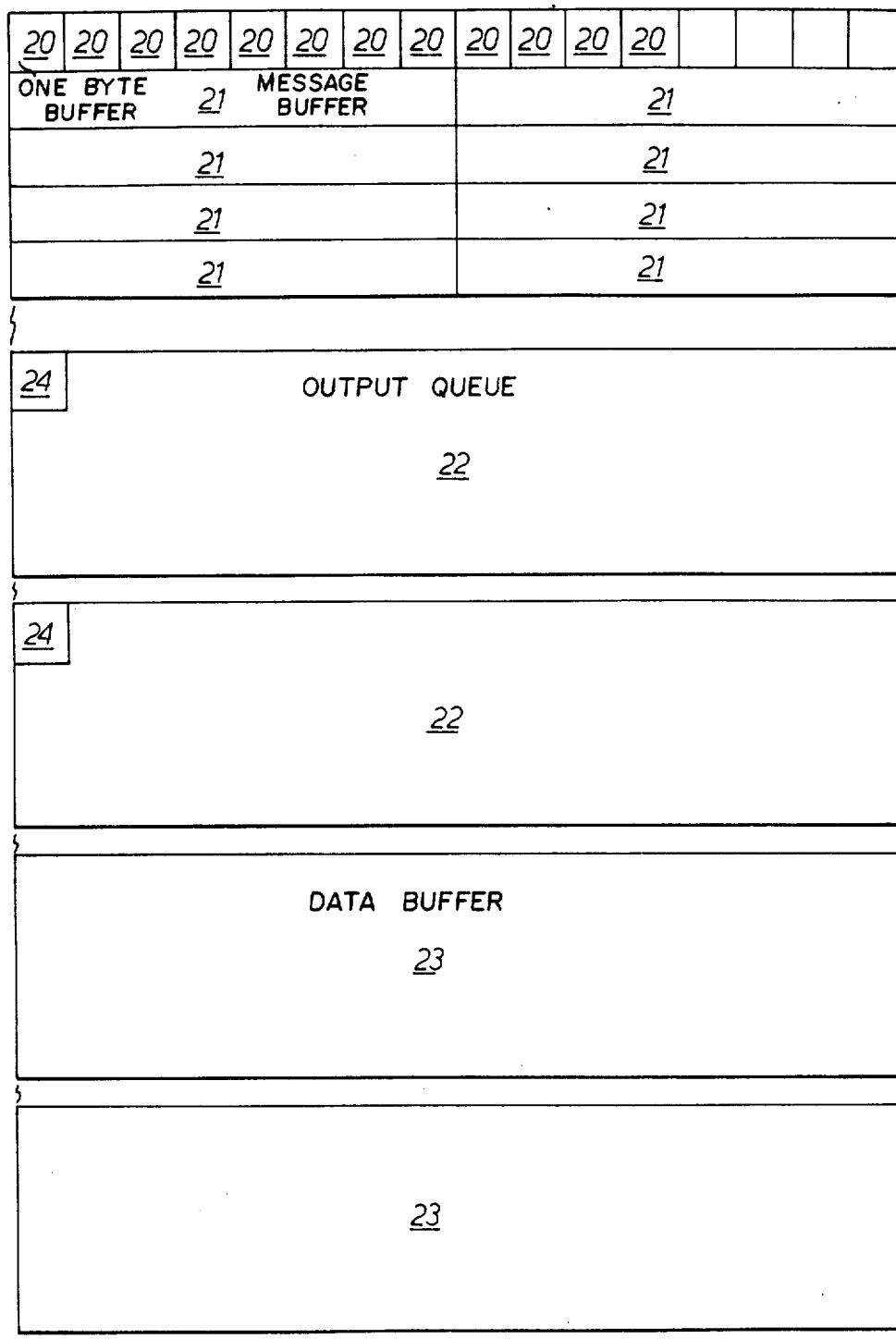
FIG. 2 is a partial memory map for a common memory which forms part of the multiprocessor testing apparatus.

A partial memory map for the common memory is shown in FIG. 2. The memory has twelve one-byte input areas 20, a plurality of eight-byte message buffers 21, twelve sixty-four-byte output queues 22 and a 255 data buffers 23.

Each of the twelve output queues 22 is uniquely associated with one of the slave processors 10. Information is supplied to a slave processor 10 by loading said information to its associated output queue. However information can only be loaded into an output queue by the master processor 11. The master processor knows the location in each output queue 22 where it last loaded data. The next load therefore immediately follows on in a cyclic fashion.

The master 11 has control over the common bus 14 and slave processors 10 must request bus access. Any of the slave processors 10 may issue a bus request at any time which is ignored by the master if the master 11 is itself accessing the common memory. When the master 11 no longer requires the common memory it issues a bus acknowledge signal which is supplied to a slave processor 10 having the highest priority. This slave processor 10 will then access the memory or pass the bus acknowledge signal to the next slave processor and so on. The arrangement is known as a daisy chain and the circuit for performing this operation is described below with reference to FIG. 3.

When a slave processor 10 has control of the bus said slave will read any information waiting in its associated output queue 22. Like the master processor stores the position in each output queue where it last implemented a write so each slave processor knows the position of the last byte it read. After reading information from a memory location in its output queue a slave processor erases that information, i.e. it loads blanks. On implementing a read to its output queue a slave processor will read information until it encounters a blank. Therefore if no information is waiting in an output queue the associated slave processor will only read one byte and then pass a bus acknowledge signal to the next slave processor in the daisy chain.

The above details how information is transferred from the master 11 to a slave 10. This procedure is also followed when a slave communicates with another slave which ensures the master has control over all information transfers. If a slave 10 is required to send information to the master 11 or to another slave it does so using one of the message buffers 21. The master 11 determines which message buffers 21 are available for each slave and more message buffers 21 may be requested by a slave during operation of the system 7. If a first slave (a source) wishes to send a message to a second slave (a destination) then the source slave processor 10 requests use of the common bus 14. When the source slave receives a bus acknowledgement signal it writes an 8-byte message into a message buffer 21, and then writes a message buffer indicator to the area 20 associated with the source processor. The source processor only has one associated area which ensures that control of the bus will be passed to another processor.

Each 8-byte message is generated in accordance with a defined structure. The first byte is a chain pointer which allows message buffers to be chained thus maintaining queues of messages. The maximum number of messages which may be chained is restricted to the number of message buffers 21 which are available to a slave processor. Therefore each slave will have to pass control of the bus to the master 11 to ensure that said slave has free buffer space.

Byte 2 is a data pointer which uniquely defines one of the 255 64-byte data buffers 23. The bulk of any information which is to be sent from a source slave processor 10 is placed in data buffer 23, for example a packet to be sent or a packet has 64 bytes but essentially they may be of any suitable length. When a destination processor receives a data pointer it takes over the ownership of the data buffer indicated by the pointer and may then access the information contained within said buffer. Therefore the bulk of information transferred between processors does not have to be physically transferred from one memory location to another memory location.

Byte 3 is a message destination label which identifies the destination slave processor 10. On reading this byte the master processor knows which output queue 22 the message is to be written to, i.e. the one associated with the destination processor. However, before the message is written to an output queue 22 the destination label is replaced with a source label which identifies the source processor to the destination processor.

The fourth byte describes the message function, for example, take over the data buffer 23 identified by the data pointer (byte 2), or send out a test frame, etc. Bytes 5 to 8 are message parameters the meaning of which is determined by the message function.

Any of the slave processors 10 may also be provided with the facility of looking ahead in their output queues 22. If they are waiting for a specific message, for example the answer to a question, then they may scan and ignore several messages until the awaited message is found. This message is then acted upon, a marker left to the effect that this message must not be read again, and the slave processor returns to the start of the previously ignored message. Of course a slave 10 cannot look further than the 64 bytes of the cyclic output queue 22 and messages are not erased while they are being scanned.

In addition to organizing the transfer of information, as described above, the master processor 11 must also ensure that all the slaves are operating in synchronism. On detecting that something has gone wrong with a slave processor the master loads a one byte crash command to a predetermined position 24 in the slaves+associated output queue. Each slave is arranged to periodically scan its respective predetermined position and on finding a crash command will set about regaining synchronization with the rest of the system while temporarily halting its external activities.

A slave processor 10 calls for memory access on (to be precise just after) the rising edge of a clock pulse and the common services board 13 provides a bus acknowledgement signal on the falling edge. By the time the bus acknowledgement signal is available all processors that require a common memory access will have asserted their requirement, thus allowing contention for use of the bus to be solved by the daisy chain arrangement.

Figure 3:
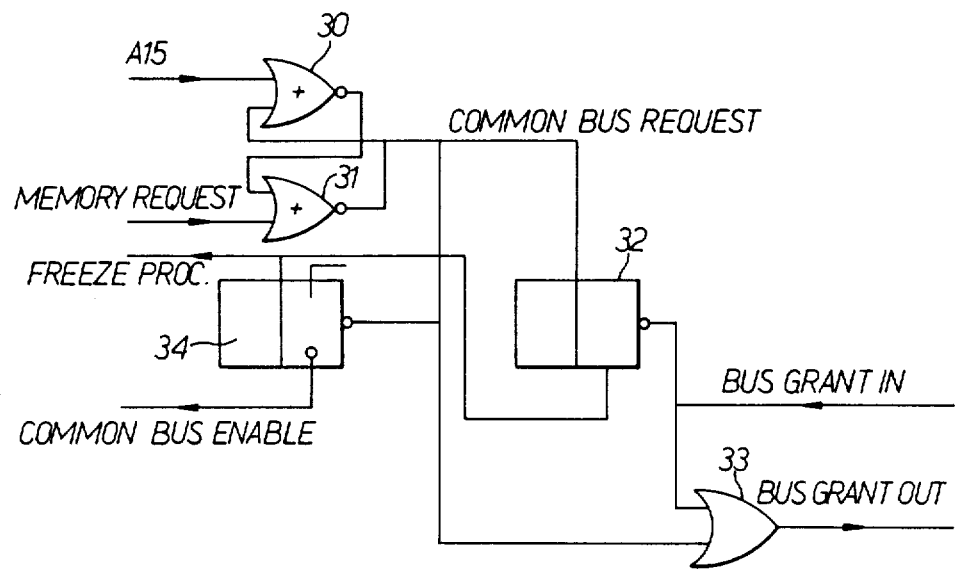
FIG. 3 is a circuit for allowing each processor of the multiprocessor system to obtain access to the common memory.

The Bus control logic for each slave processor 10 is shown in FIG. 3 and is designed to request use of the common memory bus only when necessary (i.e. the processor is attempting to access the common memory) and to hold the processor frozen until the bus becomes available. When a slave processor sets its address line A15 high, indicating a requirement for a memory access to the common memory, the output of gate 30 will be forced low. When the memory request signal from the slaves' CPU goes active (low), half a clock cycle later, the output of gate 31 will be allowed to go high which will clock a zero into a D-type bistable 32. The output of a gate 31 being high will automatically force the output a of gate 33 high, thereby making this processor's bus grant out signal false which will inhibit any processors of lower priority from accessing the bus. When "Bus grant in" goes low (and this will depend on the common services board being ready for an access at the same time as no other processors upstream requiring access) bistable 32 is preset. This transition will clock a zero into a latch 34 (since the output from gate 31 and hence the preset input is high) which means that common bus enable becomes true. Note that during the period when bistable 32 has its Q output on the CPU is held in a wait condition. When released the processor will operate the necessary signals to achieve the required memory access and when finished the memory request signal will go high again which forces the output from gate 31 low, presetting latch 34 and re-enabling the bus-grant daisy chain via gate 33. A little later, the A15 line from the CPU will go low again and the bus is released for the next cycle.

What is claimed is:

1. A multiprocessor system comprising a master processor, a plurality of independently controlled slave processors, a bus connecting the slave processors and the master processor to a common memory, said common memory including:
   (a) a plurality of message buffers, each of which is accessible to any of said processors for storing messages, each message including a label which identifies a destination slave processor,
   (b) a single input word location associated with each slave processor such that information is only supplied to an input word location from its associated slave processor, each input word location for defining the location of a message buffer and for indicating that a message must be transferred between processors,
   (c) an output queue associated with each slave processor such that the contents of an output queue are only read by its associated processor, the system arranged to transfer information from a source slave processor to a destination slave processor, in which:
   (d) a source slave processor supplies a message to an addressed message buffer and, either prior or subsequent to supplying said message, said source processor loads to its associated input word location a message buffer indicator which indicates the position of said addressed message buffer,
   (e) the master processor scans all the input word locations to detect a message buffer indicator, reads the label stored within an indicated message buffer, and supplies at least part of the message to the output queue associated with the destination processor, and
   (f) each slave processor scans and reads messages from its associated output queue.

2. A multiprocessor system according to claim 1 in which a slave processor must request use of the bus from the master processor before said slave may access the common memory.

3. A multiprocessor system according to claim 2 in which the master processor issues a bus acknowledge signal to a highest priority slave processor after receiving a bus request signal from any of the slave processors if the master does not itself require access to the common memory.

4. A multiprocessor system according to claim 3 in which the highest priority slave processor will relay a bus acknowledge signal.

5. A multiprocessor system according to claim 1 in which after reading a message the master processor replaces the label which identifies the destination processor with a label which identifies the source processor before writing the whole of said message to the associated output queue of the destination processor.

6. A multiprocessor system according to claim 1 in which each message includes a chain pointer which may identify a further message which is to be supplied to the associated output queue of the destination processor.

7. A multiprocessor system according to claim 1 in which the common memory also includes a plurality of data buffers into which data is supplied by a source slave processor and ownership of the data buffer is transferred to a destination slave processor.

8. A multiprocessor system according to claim 7 in which each message includes a data pointer which identifies a data buffer to a destination processor such that on receiving said message said destination processor takes over the ownership and has sole use of said data buffer, whereby at least some of the information which is to be transferred between processors does not have to be physically transferred from one location to another.

9. A multiprocessor system according to claim 1 in which messages are written into are written into an output queue in a cyclic manner and the master processor records the position where the last write occurred to each of said queues.

10. A multiprocessor system according to claim 9 in which each slave erases information from its associated output queue thus leaving the positions blank once said data has been read by said slave.

11. A multiprocessor system according to claim 10 in which a slave will stop reading from its associated output queue after detecting one blank.

12. A multiprocessor system according to claim 10 in which a slave scans information in its output queue without erasing said information in an attempt to locate a specific message and on detecting said message said slave will return to the unattended information in said queue.

13. A multiprocessor system according to claim 9 in which each slave processor periodically reads a predetermined location in its associated output queue out of sequence and on detecting a crash command at said predetermined location said slave processor will attempt to retain synchronization with the master processor.

14. A multiprocessor according to claim 1 in which the input word locations are consecutive memory locations.

15. A multiprocessor system according to claim 1 wherein said multiprocessor system includes a plurality of ports, each of said ports being connected to a slave processor, a packet switching network, at least some of said ports being further connected to said packet switching network, at least some of said slave processors generating data corresponding to a plurality of calls over a wide range of speeds, said system including means for recording the response of said network to said generated data.

16. In a multiprocessor system comprising a master processor, a plurality of slave processors, a bus connecting said slave processors and the master processor to a common memory, said common memory including
  (a) a plurality of message buffers, each of said buffers being assignable to any one of said processors for storing messages, each message including a label identifying a destination slave processor,
  (b) a single input word location associated with each slave processor such that information is only supplied to an input word location from its associated slave processor,
  (c) a plurality of data buffers arranged to be written to by a slave processor and read from by another slave processor, and
  (d) an output queue associated with each slave processor such that the contents of an output queue are only read by its associated processor, a method for transferring information from a source slave processor to a destination slave processor, said method comprising the steps of:
  (1) supplying from a source slave processor a message into one of the message buffers,
  (2) loading, under the control of the source slave processor, the single input word location associated with the source slave processor with a message buffer indicator to indicate the location of the addressed one of the message buffers,
  (3) scanning by the master processor only the single input word locations associated with each slave processor to detect a message buffer indicator,
  (4) reading upon the detection of a message buffer indicator the label stored within the identified message buffer,
  (5) supplying at least part of the message to the output queue assigned to the destination processor identified by the label,
  (6) assigning to the destination processor the data buffer identified by a data pointer in the message,
  (7) scanning by each slave processor the messages stored in its associated output queue, and
  (8) accessing by the destination processor the data stored within the buffer assigned by the message, whereby at least some of the information which is to be transferred between processors does not have to be physically transferred from one location to another.

17. A method according to claim 16 wherein a slave processor must request use of the bus from the master processor before said slave may access the common memory.

18. A method according to claim 17 further including issuing by the master processor a bus acknowledge signal to a highest priority slave processor after receiving a bus request signal from any of the slave processors if the master does not itself require access to the common memory.

19. A method according to claim 18 in which the highest priority slave processor will relay a bus acknowledge signal.

20. A method according to claim 16 further including replacing by the master processor after reading a message, the label which identifies the destination processor with a label which identifies the source processor before writing the whole of said message to the associated output queue of the destination processor.

21. A method according to claim 16 in which each message includes a chain pointer which may identify a further message which is to be supplied to the associated output queue of the destination processor.

22. A method according to claim 16 further including writing messages into an output queue in a cyclic manner and recording by the master processor the position where the last write occurred to each of said queues.

23. A method according to claim 16 further including erasing by each slave processor information from its associated output queue thus leaving the positions blank once said data has been read by said slave.

24. A method according to claim 23 wherein a slave will stop reading from its associated output queue after detecting one blank.

25. A method according to claim 16 further including scanning by said slave processor information in its output queue without erasing said information in an attempt to locate a specific message and on detecting said message returning to the unattended information in said queue.

26. A method according to claim 16 further including periodically reading by each slave processor a predetermined location in its associated output queue out of sequence and on detecting a crash command at said predetermined location said slave processor will attempt to regain synchronization with the master processor.

27. A method according to claim 16, wherein the multiprocessor system is connected to a packet switching network, the method further including generating data by at least some of said slave processors corresponding to a plurality of calls over a wide range of speeds transmitting the data to the packet switching network and recording the response of the packet switching network to the generated data.

28. A packet switching apparatus comprising a master processor, a plurality of independently controlled slave processors, a common memory, a bus connecting the master processor and the slave processor to the common memory; a plurality of ports including a first port, for receiving or transmitting asynchronous data, said first port being connected to a first slave processor and a second port, for transmitting or receiving packets of data, said second port being connected to a second slave processor, wherein the system is arranged to transfer data between the said ports via the common memory; said common memory comprising:
(a) a plurality of data buffers arranged to be written to by a slave processor and read from by another slave processor,
(b) a plurality of message buffers for storing messages, in which each message includes a label identifying a destination processor and a data pointer identifying a data buffer,
(c) a single input word location associated with each slave processor such that information is only supplied to an input word location from its associated slave processor, and
(d) an output queue associated with each slave processor such that the contents of an output queue are only read by its associated processor, wherein:
(e) a slave processor receives data from a port and loads said data to a selected data buffer, loads a message to a selected message buffer indicating the position of the selected data buffer and loads a message buffer indicator to its associated input word location,
(f) the master processor scans all the input word locations and on detecting said message buffer indicator loads the message to the output queue of the destination processor, and
(g) the destination processor reads the message in its output queue and assumes control of the selected data buffer whereby data in the selected data buffer is processed and transmitted via an output port connected to the destination slave processor.

29. A packet switching apparatus according to claim 28 further including a packet switching network connected to said ports, wherein the apparatus further includes means for testing the packet switching network by generating asynchronous data and packets of data and recording the response of said network to said data.

30. A packet switching apparatus according to claim 28 in which a slave processor must request use of the bus from the master processor before said slave may access the common memory.

31. A packet switching apparatus according to claim 30 in which the master processor issues a bus acknowledge signal to a highest priority slave processor after receiving a bus request signal from any of the slave processors if the master does not itself require access to the common memory.

32. A packet switching apparatus according to claim 31 in which the highest priority slave processor will relay a bus acknowledge signal.

33. A packet switching apparatus according to claim 28 in which after reading a message the master processor replaces the label which identifies the destination processor with a label which identifies the source processor before writing the whole of said message to the associated output queue of the destination processor.

34. A packet switching apparatus according to claim 28 in which each message includes a chain pointer which may identify a further message which is to be supplied to the associated output queue of the destination processor.

35. A packet switching apparatus according to claim 28 in which each message includes a data pointer which may identify a data buffer to a destination processor such that on receiving said message said destination processor takes over the ownership and has sole use of said data buffer.

36. A packet switching apparatus according to claim 28 in which messages are written into an output queue in a cyclic manner and the master processor records the position where the last write occurred to each of said queues.

37. A packet switching apparatus according to claim 36 in which each slave erases information from it associated output queue thus leaving the positions blank once said data has been read by said slave.

38. A packet switching apparatus according to claim 37 in which a slave will stop reading from its associated output queue after detecting one blank.

39. A packet switching apparatus according to claim 37 in which a slave may scan information in its output queue without erasing said information in an attempt to locate a specific message and on detecting said message said slave will return to the unattended information in said queue.

40. A packet switching apparatus according to claim 36 in which each slave processor periodically reads a predetermined location in its associated output queue out of sequence and on detecting a crash command at said predetermined location said slave processor will attempt to regain synchronization with the master processor.

41. A packet switching apparatus according to claim 28 in which the input word locations are consecutive memory locations.

* * * * *